United States Patent [19]

Saur et al.

[11] Patent Number: 5,663,880
[45] Date of Patent: Sep. 2, 1997

[54] CRUISE CONTROL ROAD SPEED CONTROL DEVICE WITH MEANS FOR INFLUENCING FLUCTUATIONS IN CONTROL

[75] Inventors: Joerg Saur, Eislingen; Thomas Linden, Stuttgart, both of Germany

[73] Assignee: Mercedes-Benz AG, Stuttgart, Germany

[21] Appl. No.: 567,769

[22] Filed: Dec. 5, 1995

[30] Foreign Application Priority Data

Dec. 5, 1994 [DE] Germany ............ 44 43 219.4

[51] Int. Cl.⁶ .................................. B60K 31/00
[52] U.S. Cl. ........................................... 701/93
[58] Field of Search ............ 364/426.04, 424.04, 364/431.07, 424.041; 180/176–179; 123/350, 352, 361

[56] References Cited

U.S. PATENT DOCUMENTS

| | | | |
|---|---|---|---|
| 4,355,607 | 10/1982 | Blaney | 123/350 |
| 4,660,672 | 4/1987 | Katoo | 180/175 |
| 4,697,478 | 10/1987 | Mastomoto et al. | 74/859 |
| 4,845,621 | 7/1989 | Kawata et al. | 364/426.04 |
| 4,953,093 | 8/1990 | Etoh | 364/426.04 |
| 4,984,166 | 1/1991 | Teratani et al. | 364/426.04 |
| 5,003,482 | 3/1991 | Teratani et al. | 364/426.04 |
| 5,051,905 | 9/1991 | Yoshida | 364/424.1 |
| 5,074,371 | 12/1991 | Shibayama | 180/175 |
| 5,154,250 | 10/1992 | Murai | 180/179 |
| 5,228,305 | 7/1993 | Vogt | 62/133 |
| 5,333,109 | 7/1994 | Oo et al. | 364/426.04 |

FOREIGN PATENT DOCUMENTS

| | | |
|---|---|---|
| 0 171 287 | 2/1986 | European Pat. Off. |
| 35 10 174 | 9/1986 | Germany. |
| 37 03 645 | 8/1988 | Germany. |
| 41 23 347 | 1/1993 | Germany. |
| 41 41 588 | 6/1993 | Germany. |
| 678303 | 8/1991 | Switzerland. |

OTHER PUBLICATIONS

*ATZ Automobiltechnische Zeitschrift* 95 (1993) entitled "Elektronisches Gaspedal für Nutzfahrzeuge" by Von Günter Gilz et al., pp. 80–88.

*Primary Examiner*—Kevin J. Teska
*Assistant Examiner*—Stephen J. Walder, Jr.
*Attorney, Agent, or Firm*—Evenson, McKeown, Edwards & Lenahan, P.L.L.C.

[57] ABSTRACT

A cruise control road speed control device optimizes the transient behavior during activation of speed control phases. The cruise control device has an additional device located outside the speed controller in the form of a load adaptation element. The load adaptation element sets the speed control output signal, upon activation of a speed control phase via an engine-load-adjusting additional signal, to a value that is required for a constant transition of the driving-force-determining control signal and in the subsequent transient phase of speed control with linkage to the output signal of the speed controller, for a return of this additional term to a value of zero, without the behavior of the speed controller being influenced thereby. This permits a very smooth transition from a previous driving phase into a cruise-control-determined speed control phase.

14 Claims, 2 Drawing Sheets

CRUISE CONTROL ROAD SPEED CONTROL DEVICE WITH MEANS FOR INFLUENCING FLUCTUATIONS IN CONTROL

BACKGROUND OF THE INVENTION

The invention relates to a cruise control road speed control device and, more particularly, to a cruise control having a speed controller and additional systems located outside the speed controller, which influence the cruise control output signal in an initial period of time of a speed control phase, with the cruise control output signal at the activation time of a speed controller phase being set to a value that is derived from the position of an associated driving-force-determining positioning element.

Cruise controls are electrical devices for controlling vehicle speed. They are activated on command from the driver, usually by means of a cruise control lever provided for this purpose. Typically, an operating lever of this kind can be used to adjust the operating modes "set and accelerate," "set and decelerate," and "resume," whereby in the first two operating modes, with only a brief actuation of the operating lever, the actual road speed is immediately set as the set road speed. When the operating lever is actuated for a longer period of time, initially the vehicle speed is changed by an acceleration control phase, and when the operating lever is released, the actual road speed prevailing at that time is set as the set road speed of the cruise control. In the "resume" mode, repeated speed control at a set road speed that is already known from a previous control phase, which is therefore already known to the cruise control, is requested, whereupon the cruise control changes the actual road speed in an acceleration control phase to this set road speed. Unless stated to the contrary, the term "acceleration" therefore also involves actual deceleration.

In the active cruise control control phases, the cruise control output signal constitutes the control signal for a control element of the motor vehicle that determines the driving force, for example by adjusting the throttle position for a motor vehicle with a gasoline engine or by adjusting the injection volume in a motor vehicle with a Diesel engine. For example, the speed controller can be a $PDT_1$ controller. A cruise control device of this type for a commercial vehicle is described in the article "Elektronisches Gaspedal für Nutzfahrzeuge" [Electronic Accelerator for Commercial Vehicles], Automobiltechnische Zeitschrift 95 (1993) 2, page 80, by G. Gils and A. Vokan.

Under the control influence, at the beginning of a speed control phase in cruise control operation, oscillating processes occur during the control phase which can produce a reduction in driving comfort unless additional measures are taken. Thus, when activated through the "set and accelerate" or "set and decelerate" operating modes, the cruise control knows the set road speed to be maintained at the setting time for subsequent speed control, but it has no information from the other systems as to which cruise control output signal, in other words what throttle position or which injection volume, is required to maintain this set road speed at the current engine load state. If the speed controller is operated, the initial speed control deviation has a value of 0 and the initial cruise control output signal corresponds to an idle position. The vehicle would therefore usually travel more slowly at first without any additional measures until a control deviation occurred and the position of the driving-force-determining positioning element, required for constant travel with the time constant of the cruise control controller-vehicle-road system, would apply. Such a vehicle-decelerating functional takeover of cruise control reduces occupant comfort.

Similar transient problems occur in the transition from the acceleration to the speed control phase, as can occur in the "set and accelerate," "set and decelerate," and "resume" operating modes. The basic difficulty here also consists in the fact that the cruise control, without additional measures, cannot determine which position of the driving-force-determining control element is required after the acceleration control phase for the constant travel to follow. In a conventional cruise control, in which the acceleration control phase is accomplished by a P control with a rampwise rising set speed value until the actual speed has reached the desired set speed, a relatively high overshoot of the actual speed then occurs which in turn leads to a subsequent phase with negative acceleration. In the "resume" mode, although the system knows the desired set speed already, so that the acceleration curve can be selected more carefully in the acceleration control phase, overshooting beyond the set speed cannot be avoided with the control unit alone, since the flat set acceleration ramp required for this results in control behavior that is too sluggish.

In order to somewhat counteract the control oscillation effects described above, most conventional cruise control systems use a pause signal that depends on the speed and which is added to the output signal for the speed controller to form the cruise control output signal. The curve of this pause signal as a function of the actual speed can be linear or curved, and is usually oriented toward the value required for constant travel on a level surface. By adding this pause signal, the speed controller then usually reaches its operating point faster. One method of operation of this type is described, for example, in U.S. Pat. No. 5,333,109. However, there, the pause signal is merely a compromise for different engine load states and, therefore, cannot ensure in most cases a completely seamless transition from accelerator operation to cruise control operation. Thus, for example, on a downhill road with a low engine load and therefore less required engine power to keep the speed constant, a jerk occurs upon engaging the cruise control as a result of an overly high cruise control starting value. This jerk is uncomfortable especially when coasting. At a higher engine load than when travelling on a level surface, for example uphill, the pause signal is insufficient to prevent the actual speed from faltering.

Systems that have been developed further, which have engine load information available, for example systems with an electronic accelerator, utilize this information by feeding it into the speed controller and adjusting its control parameters to be able to permit the speed controller to start more accurately at the actual load state. As a result of the controller recursion formulas, the influence of a control starting slate supplied in this fashion on the controller output value becomes smaller with each recursion loop, so that in fact after only a few computer cycles which are usually between 10 ms and 30 ms, the original load information no longer has a significant effect on the controller output signal and the cruise control behavior is determined almost exclusively by the speed control deviation. Despite a precise transmission of the load information set by the accelerator, the vehicle is therefore generally somewhat slower when speed control begins until speed control deviation occurs.

A system of this latter sort is disclosed in German Patent document DE 37 03 645 A1. The controller used therein operates in acceleration control phases as a pure proportional controller and in speed control phases as a PI controller with the control parameters being selectable as a function of the operating state. In particular, to change from an acceleration control phase to a speed control phase, provision is made for changing the driving-force-determining control signal abruptly at first in the direction of a smaller acceleration value and then switching from the P acceleration control to the PI speed control when the actual acceleration has dropped to zero. During this switch, the existing output value of the P controller is selected as the starting value for the integral part of the PI controller and the existing actual speed is chosen as the set speed. Swiss Patent 678 303 A5 teaches another cruise control system in which the control parameters are set at the beginning of a speed control phase as a function of the current driving state. In this system, an acceleration controller and a speed controller are provided in parallel, which are controlled by a state control. The state control always switches at appropriate times between the two controllers and sets their control parameters, whereby in particular at the switching moment to a speed control phase, the integral part of the speed controller implemented as a PI controller is set to an initial value which corresponds to the fuel supplied at the end of the previous acceleration phase. This value is further reduced by an amount that is proportional to the actual acceleration, and at the same time, the actual speed is set as the transitional set speed. As soon as the actual acceleration reaches the value of zero, the set speed is set to the actual speed which then prevails.

To improve the transient behavior of a speed controller, German Patent document DE 41 41 588 A1 describes feeding the actual speed to the set speed after a preset time function when the former has left a specified maximum range around the set speed in speed control operation. A $PDT_1$ controller can be used in this application, for example, as a speed controller.

European Patent document EP 0 171 287 A2 describes a road speed control device with which a speed control phase can be activated by a set switch. The set speed is set to the actual speed at the activation time. A unit that can be activated by the set switch is provided in parallel with the normal speed control circuit. The unit completely controls the driving-force-determining control element for an adjustable period of time at the beginning of a speed control phase. After this period of time has elapsed, a switch is made to the normal control circuit in which the position of the control element corresponds to the difference between the actual and set speeds. The brief complete control of the driving-force-determining control element is intended to counteract the faltering of the speed at the beginning of speed control phases.

A cruise control speed control device according to this species is known from German Patent document DE 41 23 347 A1. In this device, additional electronic means ensure that the set value for a power setting element of the engine is set to a pilot value at the activation point of control. This value is derived from the position of the power setting element. Then, the normal speed control is performed without there being any further adaptation of this pilot value.

The present invention is based on the technical problem of providing a cruise control speed control device of the above-mentioned type which has an improved transient behavior for beginning speed control phases.

This problem is solved by a cruise control speed control device with a speed controller and additional systems located outside the speed controller, which influence the cruise control output signal in an initial period of time of a speed control phase, with the cruise control output signal at the activation time of a speed controller phase being set to a value that is derived from the position of an associated driving-force-determining positioning element. The additional systems incorporate a load adaptation element, which at an activation time of a speed control phase generates an initial engine load adaptation signal in such fashion that the cruise control output signal at this point in time corresponds to the current position of the associated driving-force-determining positioning element. This initial adaptation signal, up to the end of the initial period of time of the speed control phase, drops to zero with linkage to the speed controller output signal.

The load adaptation element located outside the controller first ensures that at the moment of the switch to a speed control phase, the resultant cruise control output signal will correspond to the engine load at the moment. This is so that the speed control cruise control operation that is beginning, as desired, will start with the position of the driving-force-determining control element at the switching time. In addition, the engine load adaptation element ensures that the output signal value initially prepared by it for this constant control takeover is reduced to zero during the subsequent transient phase with involvement of the output signal from the activated speed controller. Then the influence of this initial adaptation signal value can decrease during the transient phase of speed control without changing the parameters of the speed controller itself. Hence, the speed controller remains closer to the working point during the transient phase for subsequent steady-state control. At the same time, the lack of abrupt changes in the control parameters has a favorable effect on the transient behavior at the beginning of the speed control phases so that overall with these measures, an optimized transient behavior at the beginning of speed control is achieved without overshooting effects occurring to cause problems and/or undesired acceleration or deceleration effects.

There are several advantageous possibilities for reducing the engine load adaptation signal during the transient phase. Thus, for example, provision can be made to reduce the initial engine load adaptation signal value in stages by appropriate increments of the controller output signal when the controller output signal value or its change increment as a function of time has a sign which differs from the engine load adaptation signal value. Provision can be made such that in cycles in which the controller output signal and the engine load adaptation signal have the same sign, their sum, and in cycles in which they have different signs, the engine load adaptation signal reduced by the subtracted controller output signal increment, contribute to the cruise control output signal. Alternatively, it is possible to link the engine load adaptation signal and the output signal from the speed controller in the load adaptation element in such fashion that the total of the initial engine load adaptation signal value and the current controller signal value contributes to the cruise control output signal until the latter reaches a value of zero at a later point in time. By suitable controller initialization, at especially favorable points in time, the control of the previous influence of the engine load adaptation signal can be transmitted to the controller output signal and, therefore, through the controller recursion formulas to the subsequent controller behavior.

An advantageous embodiment of the present invention permits optimization of the transient behavior at the beginning of a speed control phase following a previous acceleration control phase especially in one of the "set and accelerate" or "set and decelerate" operating modes. The load adaptation element then sets the initial engine load adaptation signal to a value that corresponds to the proportional percentage of the acceleration controller at the end of the previous acceleration control phase. This in turn allows a smooth transition with very low transient effects from the acceleration control phase to the speed control phase. For additional optimization of the transient behavior, a certain minor change in the set speed value in the direction of the actual speed change at the end of the previous acceleration control phase can take place after a preset period of time. This is done in order to catch the return swing that occurs after the initial overshoot beyond the set speed that was initially set to the current actual speed, and thus smooth the transient curve subsequently.

In another preferred embodiment of the invention for such transitions from acceleration control phases to speed control phases, like those that occur in the "resume," operating mode, provision can be made at the point in time at which the ramp speed for the acceleration controller reaches the set speed, to switch from acceleration control operation to speed control operation and thereby set the dynamic, immediately effective proportional share of the acting speed controller to the proportional share of the acceleration controller at the end of the acceleration control phase. As soon as the actual speed has reached the set speed, the proportional speed of the speed controller, implemented for example as a $PDT_1$ controller, is again set to the value provided for steady-state speed control phases.

It is understood that the above measures according to the invention can be combined with additional conventional measures for weakening the control oscillation effects, especially the provision of a pilot value that depends on speed and contributes additively to the cruise control output signal, and which can be set for an initially correct setting of the driving-force-determining control element during travel on a level surface with a typical load. An additional conventional measure that can be combined with the invention in the "resume" mode consists in changing the actual speed more slowly to the set speed by weakening the proportional shares of the acceleration and possibly also the speed controllers when the ramp speed and/or the actual speed approaches the set speed.

Other objects, advantages and novel features of the present invention will become apparent from the following detailed description of the invention when considered in conjunction with the accompanying drawings.

DETAILED DESCRIPTION OF THE DRAWINGS

Figure 1:
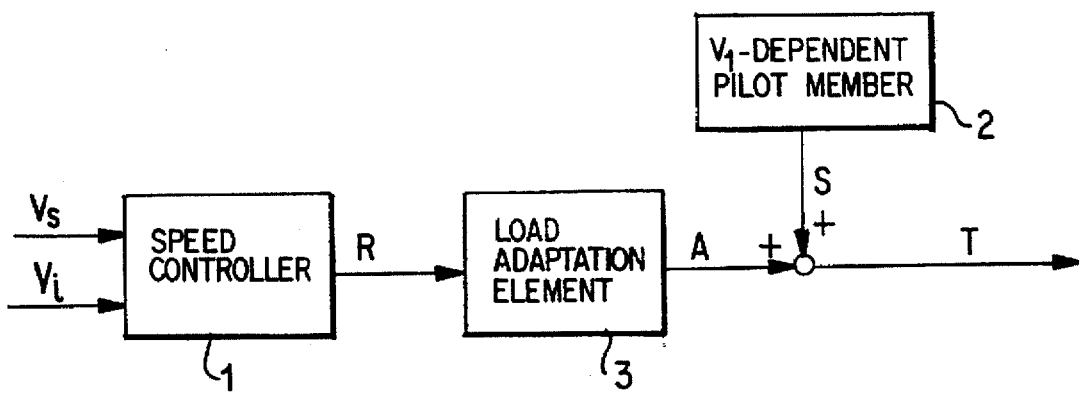
FIG. 1 is a schematic block diagram of a cruise control road speed control device with a load adaptation element.
Figure 2A:
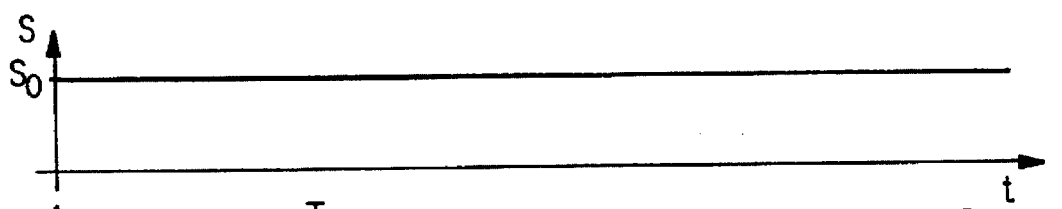
FIG. 2 is a group of timing curves illustrating an operating mode that can be implemented with the device in FIG. 1.
Figure 2B:
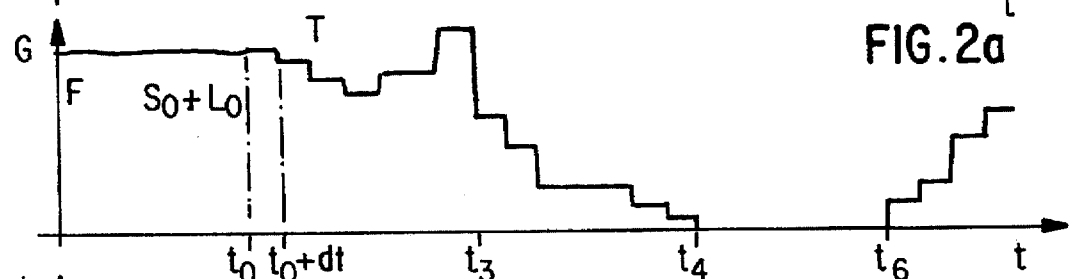
Figure 2C:
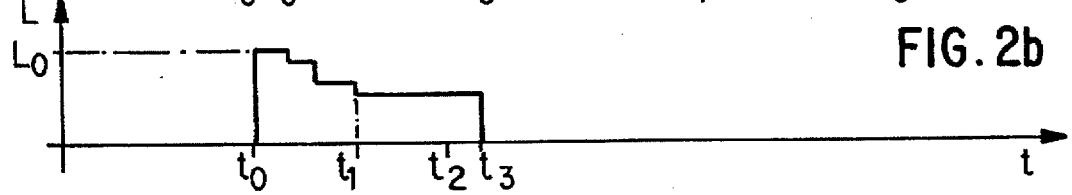
Figure 2D:
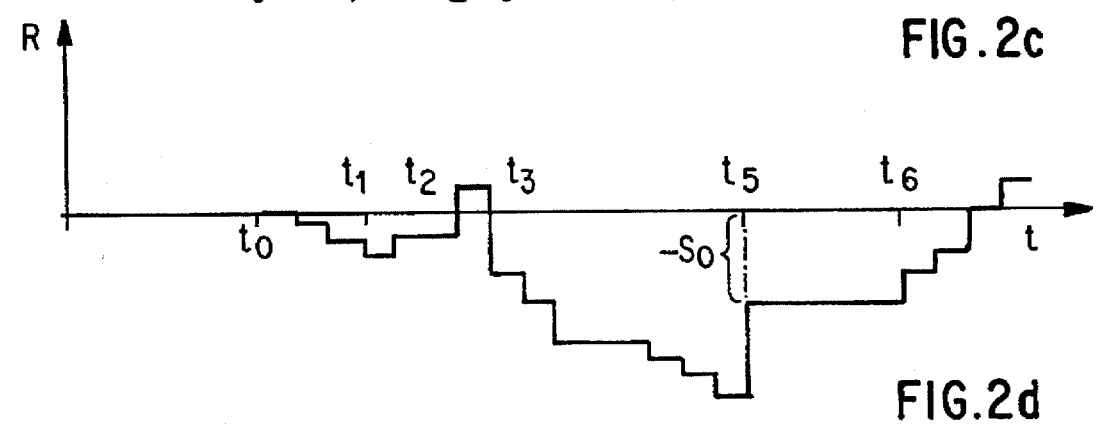

Referring to FIG. 1, the cruise control includes a speed controller 1, designed as a $PDT_1$ controller, and a load adaptation element 3. A pilot member 2 for generating an additional signal that depends on the actual speed is provided as a controller-external additional system for influencing the cruise control output signal (T). In addition, the cruise control contains other units not shown explicitly, especially for controlling the components shown, as for example an operating lever, sensors that detect engine load, and a central control unit. The speed controller 1 uses a $PDT_1$ recursion formula to generate an output signal (R) that depends on the difference between the actual and set speed values supplied on the input side. This signal (R) is fed to the load adaptation element 3 which in turn delivers an output signal (A). In a manner to be described below, the output signal. (A) results from the controller output signal (R) and from an engine load adaptation signal (L) generated by the.16ad adaptation element 3 (refer to the second graph from the bottom in FIG. 2).

To generate the resultant cruise control output signal (T), the output signal (S) of the pilot member 2 is added to the output signal (A) of the load adaptation element 3. This pilot signal (S), which acts throughout the entire active cruise control operation (see top graph in FIG. 2), is determined using a preset curve as a function of the actual speed. The preset curve usually has a pattern for the pilot signal (S) that rises constantly and at least partially linearly, with the rising actual speed. With this additional signal value (S), a so-called speed-proportional pause is prepared for the cruise control system, which is chosen so that it ensures the correct setting of a driving-force-determining control element, i.e., for example, the throttle in a gasoline engine or the injection unit in a Diesel engine, during a typical travel at constant speed on the level. As a result, the speed controller can remain approximately at its zero setting with its working range in this typical driving state. In addition, in this manner the speed controller reaches this working point more rapidly for subsequent speed control when activated from its inactive state. With pilot member 2 as the only additional measure for the speed controller 1, the transient behavior of the cruise control at the beginning of the speed control phase is still not satisfactory, especially when the starting condition for the speed control phase differs significantly from constant travel on the level, e.g. when travelling downhill or uphill. For further optimization of the transient behavior therefore, the load adaptation element 3 is used whose function will now be described with reference to FIG. 2.

FIG. 2 shows four graphs one above the other for the same time which, from top to bottom, show the time curve of the pilot signal (S), the active control signal (G) for the driving-force-determining control element, the engine load adaptation signal (L) generated by the load adaptation element 3, and the controller output signal (R), showing the case where the vehicle driver at an initial point in time ($t_0$), by only a brief actuation of the cruise control operating lever, switches the cruise control operation to the "set and accelerate" or "set and decelerate" mode and the set speed is thus set to the actual speed at this point in time ($t_0$). Until this activation point ($t_0$), the speed controller 1 and the load adaptation element 3 are inactive, so that the controller output signal (R) and the engine load adaptation signal (L) are zero. The control signal (G) for the driving-force-determining control element is provided during this inactive cruise control state by the accelerator position (F). The pilot signal (S) is generated throughout, but with the cruise control deactivated it has no influence on the driving-force control signal (G). During the period of time shown in FIG. 2, the pilot signal (S) remains at an approximately constant value ($S_0$) because the actual speed mainly remains constant.

At the point in time ($t_0$) when the cruise control is activated, speed controller 1 under these assumptions initially begins with a controller output signal (R) which is at zero. At the same time the accelerator signal (F) is separated from the cruise control output signal (T) while the driving-force control signal (G) is being generated. Then, the load adaptation element 3 produces a value ($L_0$) which here is assumed to be positive for the engine load adaptation signal (L) in such fashion that, with the addition of pilot signal value ($S_0$), it results in an initial cruise control output signal value (T) which corresponds to the accelerator signal (F) at the end of the previous driving operation. This is done so that the driving-force control signal (G) continues to be conducted. The output signal (A) of the load adaptation element 3 at activation time ($t_0$) therefore consists of this initial engine load adaptation signal ($L_0$), for whose generation the information about the momentary value of the driving-force control signal (G) is supplied to the load adaptation element 3 in a manner not shown in greater detail.

Cruise control then proceeds through iterative control cycles with time intervals (dt) which are typically a few intervals of 10 ms. In the example shown in FIG. 2, during the first control cycle a controller output signal (R) is obtained which becomes more negative up to a point in time ($t_1$). This is then utilized by load adaptation element 3 to internally reduce the initial load adaptation signal value ($L_0$) by the increments by which the controller output signal (R) becomes more negative. As the output signal (A), the load adaptation element 3 simultaneously passes the sum of the adaptation signal initial value ($L_0$) and the current controller output signal value (R), so that the cruise control output signal (T) and thus the driving-force control signal (G) then change in synchronization with the controller output signal (R). As can be seen at time ($t_2$) in FIG. 2, the internal reduction of the positive engine load adaptation signal (L) is only performed when there are negative controller output signal changes, while in control cycles in which the controller output signal (R) remains constant or changes by a positive increment, it is kept constant. At a point in time ($t_3$), finally, the engine load adaptation signal (L) is completely reduced internally. From this point in time on, the system monitors to detect when, for the first time, the cruise control output signal (T), that continues to be composed of the sum of the controller output signal (R), pilot signal (S), and load adaptation signal initial value ($L_0$), has dropped to zero. In FIG. 2 this has occurred at a point in time ($t_4$). The central cruise control then switches in a subsequent control cycle at point in time ($t_5 = t_4 + dt$), the controller output signal (R) to the negative value ($-S_0$) of the pilot signal (S) at this point in time and limits the controller output until, at a point in time ($t_6$), a controller output signal (R) is obtained that begins to grow again. At the same time as the controller output signal initialization, the engine load adaptation signal (L) is deleted in the load adaptation element 3. The load adaptation element 3 passes the controller output signal (R) unchanged as its output signal (A) for subsequent speed control.

Clearly from the function of the load adaptation element 3 located outside the speed controller 1, there is both an exact takeover of driving-force control signal (G), i.e. for example of the throttle position, upon the initiation of a cruise control speed control phase by choosing a suitable starting value ($L_0$) of the engine load adaptation signal (L) as well as a smooth transition to the steady-state speed control operation within a transient phase without large jumps in the position of the driving-force-determining control element and, hence, without any disturbing excessive speed oscillation effects and/or sudden acceleration effects.

In addition to the case shown for an initially positive engine load adaptation signal (L) which corresponds to a state of increased engine load, e.g. when driving uphill, as well as a controller output signal that becomes negative when the speed control kicks in because the engine load is decreasing, of course the other cases of this system can be controlled in this manner with an optimized transition. When the engine load increases with the engine load adaptation signal initially positive, initially there is a positive controller output signal value which is then added together with the constant engine load adaptation signal value to the pilot signal to create the cruise control output signal. Similarly, with an initially negative engine load adaptation signal, the procedure is such that this signal is considerably reduced internally toward zero by positive changes in the controller output signal, while in cycles with constant or negative-trending controller output signals it is kept constant. Alternatively to this procedure, to reduce the initial engine load adaptation signal to zero, provision can be made to reduce the engine load adaptation signal not by the incremental changes in the controller output signal but by the amount of the controller output signal itself in those control cycles in which these two parameters have different signs. As an alternative to the described, merely internal breakdown of the initial engine load adaptation signal, provision can be made such that the load adaptation element 3 delivers not the sum of the initial engine load adaptation signal ($L_0$) and controller output signal (R), but the current engine load adaptation signal (L) as an output signal (A), and thus as a contribution to the cruise control output signal (T). It is characteristic of each of these versions that the load adaptation element 3 located outside the speed controller 1 makes an additional contribution to the cruise control output signal (T) when the cruise control is switched on. This ensures correct transition of the current driving-force control signal without influencing controller behavior. The influence of the additional, initial engine load adaptation signal on the cruise control output signal during the subsequent transient phase of speed control is reduced comparatively slowly so that a more uniform transient behavior is obtained than in known systems. In the known systems, the initial additional value for takeover of the previous position of the driving-force-determining positioning element takes place in the speed controller itself, in other words by temporarily changing its controller parameters.

A cruise control implementation will now be described with reference to FIGS. 3 to 5 which shows an optimized transient behavior in an initial speed control following a previous acceleration control phase. Such transient phases occur in incipient speed control phases in the operating modes known as "set and accelerate" and "set and decelerate" with longer operating lever actuation, and also in the "resume" operating mode.

Figure 3:
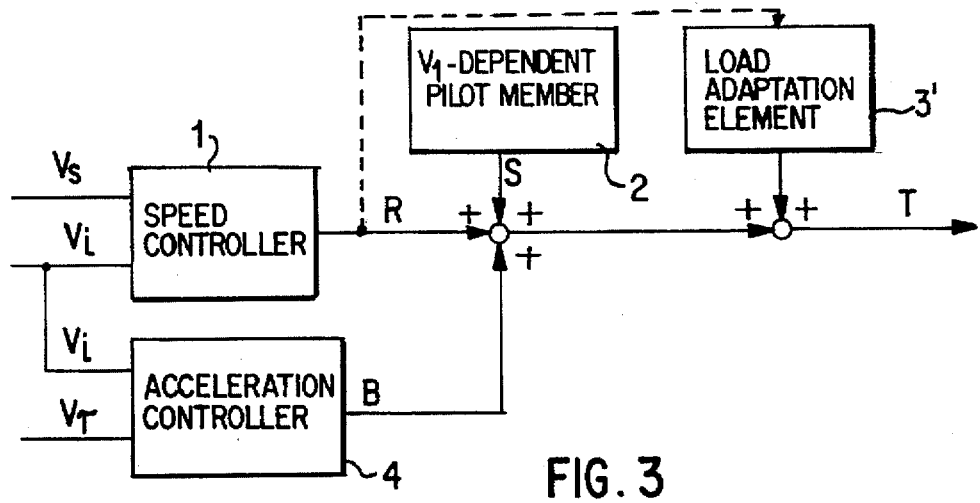
FIG. 3 is a schematic block diagram of a second embodiment of a cruise control road speed control device with a load adaptation element.
Figure 4:
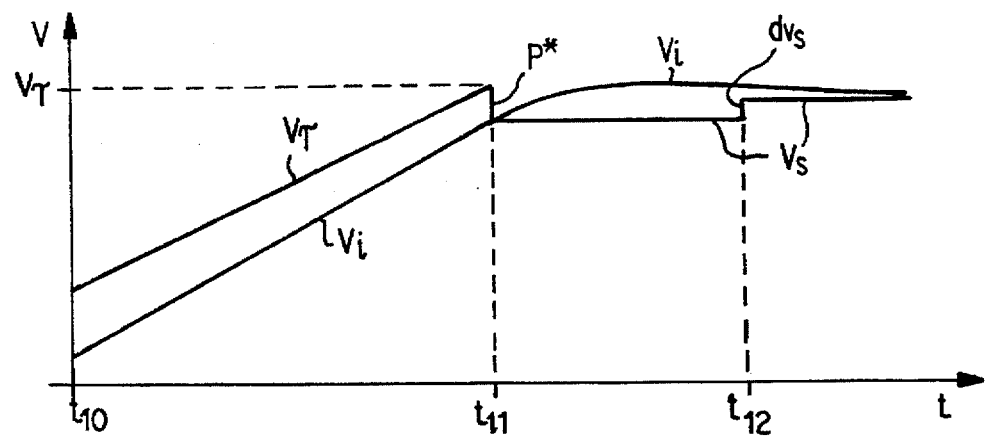
FIG. 4 is a graphic representation of speed curves during a transition from an acceleration control phase to a speed control phase in the "set and accelerate" mode, with the device in FIG. 3.

The cruise control according to FIG. 3 essentially corresponds to that in FIG. 1, so that the same reference numerals have been used. For a better understanding of the transitions from the acceleration control phases to the speed control phases described below, FIG. 3 shows explicitly an acceleration controller 4 arranged in parallel with a $PDT_1$ speed controller 1, to which, in addition to the actual speed ($v_i$), a ramp speed ($v_r$) is supplied. The acceleration controller 4 designed as a pure P controller generates from these input signals in the acceleration control phases, an output signal (B) as an additive contribution to the cruise control output signal (T). A similar additive contribution is supplied by output signal (R) of speed controller 1. The speed controller 1 only becomes active at the beginning of a speed control phase. The acceleration controller 4 is active only in the acceleration control phase that may precede the speed control phase. As in the case of FIG. 1, the pilot member 2 also contributes with its actual-speed-dependent output signal (S) to the cruise control output signal (T). In the example of a cruise control shown in FIG. 3, a modified load adaptation element 3' is provided in such fashion that it, like the other components, contributes additively to the cruise control output signal (T) with its output signal (A').

With this arrangement, in the case of incipient speed control phases without previous acceleration control phases, the same transient behavior results as described in FIGS. 1 and 2. The load adaptation element 3' is analogous to the load adaptation element 3 of FIG. 1 in the transient phase, and can deliver the initial engine load adaptation signal ($L_0$), optionally reduced by the output signal increments of the speed controller 1, or it can operate in a suitably modified fashion. In particular, in a version that is represented by the dashed lines in FIG. 3, provision can be made to supply output signal (R) of speed controller 1 on the input side to the load adaptation element 3'. This is done in order either to cause at that point an internal reduction of the engine load adaptation signal (L) with a simultaneous direct addition of the speed controller output signal (R) to the cruise control output signal value (T). Alternatively, it can interrupt the direct addition of the speed controller output signal (R) to the cruise control output signal (T) and instead, through the load adaptation element 3' in the manner described in FIGS. 1 and 2, with the same sign for the speed controller output signal (R) and the engine load adaptation signal (L), to generate the sum of both signals or, with different signs thereof, to generate the engine load adaptation signal reduced by a controller output signal increment as a contribution to the cruise control output signal (T). In addition, in a manner not shown in greater detail, information about the respective current P percentile value of the acceleration controller 4 can be supplied on the input side to the load adaptation element 3'.

The cruise control arrangement thus chosen allows very gentle transitions to be made from the acceleration control phase to the speed control phase. This will be explained first with reference to such an operating phase in the "set and accelerate" operating mode according to FIG. 4. The graph in FIG. 4 starts at a point in time ($t_{10}$) at which, by operating the cruise control lever for a longer time, the acceleration controller 4 is activated in the "set and accelerate" position, whereupon the actual speed ($v_i$) follows the ramp speed ($v_r$) with a linear rise, and a time shift. At point in time ($t_{11}$) the actual speed ($v_i$) has reached the set speed ($v_s$) desired by the driver, whereupon by releasing the operating lever a switch is made to the subsequent speed control phase, whereupon acceleration controller 4 is shut off and speed controller 1 is activated. At the same time the load adaptation element 3' assumes the proportional value (P*) prevailing at this point in time on the acceleration controller 4. The proportional value corresponds to the difference between the ramp speed end value ($v_{re}$) and actual speed ($v_i$) at this switching time ($t_{11}$). Load adaptation element 3' processes this initial P* input value according to the same process described for the initial engine load adaptation signal ($L_0$) in FIGS. 1 and 2. Then, with its output signal (A'), it ensures that the cruise control output signal (T) at the beginning of speed control phase ($t_{11}$) is always connected to the previous cruise control output signal at the end of the acceleration control phase.

In the following transient phase of speed control, this P* value is gently decreased by load adaptation element 3' in the same manner as the initial engine load adaptation signal ($L_0$) in the case of FIGS. 1 and 2. In this manner, after switching to the speed control, initially a comparatively slight overshoot of the actual speed ($v_i$) occurs, which then makes the transition to a slow convergent decline in actual speed ($v_i$). In order to avoid control oscillation effects even better, at a later point in time ($t_{12}$), the set speed ($v_s$) is raised by a selectable set speed increment ($dv_s$). Both the point in time and the height of this increment are system-dependent. Suitable values can be determined for example experimentally. The incremental set speed increase prevents an undershoot of the actual speed ($v_i$) as the result of an excessive decrease in the cruise control set value (T). This slight change in the set speed cannot be perceived by the driver since the tachometer in the vehicle lags behind the actual speed in any case and therefore at the activation time ($t_{11}$) of the speed control is smaller than the driver believes. Subsequently, control takes place around this corrected set speed. In full analogy with the case in FIG. 4, in a reciprocal fashion the procedure takes place when a switch is made from the acceleration control phase to the speed control phase in the "set and decelerate" mode, so that it will not be necessary to describe this case explicitly.

Figure 5:
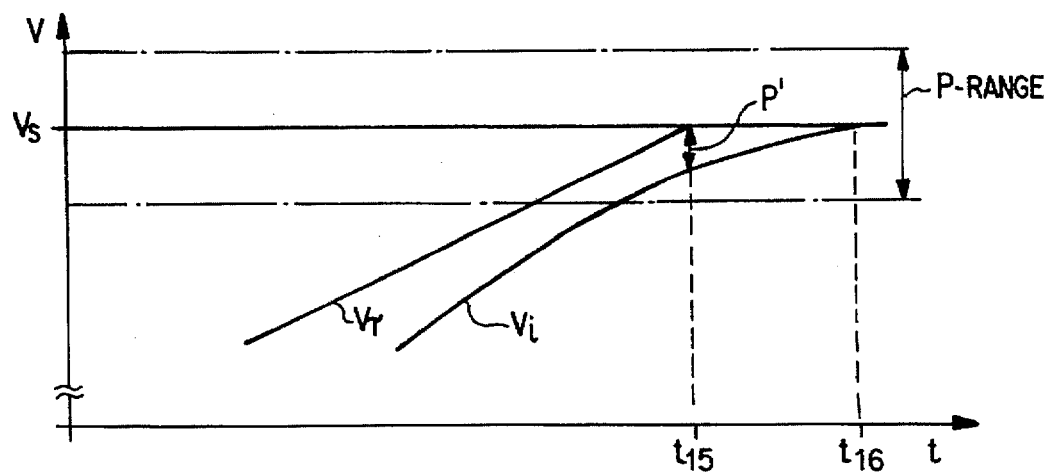
FIG. 5 is a graphic representation of speed curves during a transition from an acceleration control phase to a speed control phase in the "resume" mode with the device of FIG. 3.

One possible way of optimizing the transient behavior with incipient speed control phases in the "resume" mode is described in FIG. 5. In this case, the desired set speed ($v_s$) is known in advance by the cruise control. This is then used to switch from the previous acceleration control phase to the subsequent speed control phase at a point in time ($t_{15}$) in which the ramp speed ($v_r$) has reached the set speed ($v_s$). The initial knowledge of the set speed ($v_s$) is also utilized in a conventional fashion by stepwise reduction of the proportional value of acceleration controller 4, to bring the actual speed ($v_i$) at the end of the acceleration control phase to the set speed ($v_s$) with less of a gradient. In the case shown in FIG. 5, at switching time ($t_{15}$), the proportional value (P') is still on the acceleration controller 4. The speed controller 1 which is activated at this moment then receives this proportional value (P') as its dynamic proportional part, i.e. as the part that immediately reacts to a jump in the set value, for its $PDT_1$ control behavior with this proportional value (P') being located inside the P range of the $PDT_1$ speed controller shown for comparison purposes in FIG. 5. It is only at a later point in time ($t_{16}$) when the actual speed ($v_i$) has reached the set speed ($v_s$) that the dynamic proportional share of the $PDT_1$ speed controller (1) is again set to its normal value, so that the transition to the subsequent steady-state speed control is complete.

It is understood that the functions described above can be combined with one another in suitable fashion. Thus in an operating phase corresponding to FIG. 5, load adaptation element 3' can additionally engage in a supporting manner suitably. Except for the cruise control structures shown, additional versions are possible whereby it is characteristic that at the beginning of the speed control phases, by an intervention in the cruise control output signal-forming lines outside the speed controller, assurance is provided that at the activation point of speed control the driving-force-determining control signal is continuously taken over and the engine load adapting additional term required for this is reduced outside the speed controller to zero.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cruise control road speed control device for a motor vehicle, comprising:

a speed controller having a speed controller output signal (R);

a load adaptation element located outside of, and coupled to, said speed controller, said load adaptation element influencing a cruise control output signal (T) in an initial time period of a speed control phase;

wherein at an activation time ($t_0$) of the speed control phase, said load adaptation element generates an initial engine load adaptation signal ($L_0$) such that said cruise control output signal (T) based on the initial load adaptation signal ($L_0$), takes over a driving force control signal (G) from a current position of an associated driving-force-determining positioning element at this point in time; and wherein said initial engine load adaptation signal ($L_0$) up to an end of the initial period of time of the speed control phase, drops to zero based on a linkage to the speed controller output signal (R).

2. A cruise control road speed control device according to claim 1, wherein said load adaptation element, in order to return the initial engine load adaptation signal ($L_0$) to zero in a control cycle, subtracts one of a signal value and a signal value increment of the speed controller output signal (R) proportionally from a current engine load adaptation signal (L), when the signal value or signal value increment and the current engine load adaptation signal have different signs.

3. A cruise control road speed control device according to claim 2, wherein initialization of the speed controller output signal (R) occurs after the engine load adaptation signal (L) has dropped to zero.

4. A cruise control road speed control device according to claim 2, wherein initialization of the speed controller output signal (R) occurs after the engine load adaptation signal (L) has dropped to zero and after the cruise control output signal (T) has reached a value of zero.

5. A cruise control road speed control device according to claim 1, further comprising an acceleration controller arranged in parallel with said speed controller, said cruise control road speed control device operating in at least one of several possible operating modes such that upon a switch from an acceleration control phase to the speed control phase, the current actual speed is set as a set speed and the initial engine load adaptation signal ($L_0$) is set to correspond to a proportional value (P*) of said acceleration controller existing at the time of said switch.

6. A cruise control road speed control device according to claim 5 wherein a set speed ($v_s$) for the speed control phase is changed in a direction of the actual speed change at an end of the acceleration control phase after a presettable period of time ($t_{12}-t_{11}$) after switching by a presettable additional value ($dv_s$).

7. A cruise control road speed control device according to claim 1, further comprising:

an acceleration controller arranged in parallel with the speed controller wherein in at least one of the possible operating modes a switch is made from an acceleration control phase to a speed control phase when a ramp signal value ($v_r$) supplied to the acceleration controller corresponds to a preset set speed value ($v_s$); and a dynamic proportional share of the speed controller at a switching time ($t_{15}$) is set to a value (P') which corresponds to that of the acceleration controller at the end of the acceleration control phase, and is reset to its value used for steady-state speed control phases as soon as an actual speed ($v_i$) has reached the set speed ($v_s$).

8. A method for operating a cruise control road speed control device for a motor vehicle having a speed controller providing a speed controller output signal (R) and, located outside of the speed controller and coupled thereto, a load adaptation element providing an engine load adaptation signal (L), the method comprising the steps of:

generating an initial engine load adaptation signal ($L_0$) at an activation time ($t_0$) of a speed control phase such that a cruise control output signal (T) based on the initial engine load adaptation signal ($L_0$) takes over a driving force control signal (G) from a current position of an associated driving-force-determining positioning element at the activation time; and reducing the initial engine load adaptation signal to zero based on a linkage to the speed controller output signal up to an end of an initial period of time of the speed control phase.

9. A method according to claim 8, wherein an acceleration controller is arranged in parallel with the speed controller, the method further comprising the steps of:

switching from an acceleration control phase to the speed control phase when a ramp signal value ($v_r$), supplied to the acceleration controller, corresponds to a preset speed value ($v_s$);

setting a dynamic proportional share of the speed controller at a switching time to a value which corresponds to that of the acceleration controller at the end of the acceleration control phase; and resetting the dynamic proportion share of the speed controller to a value used for steady-state speed control phases as soon as the actual speed ($v_i$) reaches the set speed ($v_s$).

10. A method according to claim 8, wherein an acceleration controller is arranged in parallel with the speed controller, the method further comprising the steps of:

in at least one of the possible operating modes, upon a switch from an acceleration control phase to the speed control phase, setting the current actual speed as a set speed; and setting the initial engine load adaptation signal to correspond to a proportional value of the acceleration controller existing at the switching time.

11. A method according to claim 10, further comprising the steps of:

changing the set speed ($v_s$) for the speed control phase in a direction of the actual speed change at the end of the acceleration control phase after a presettable period of time and after switching by a presettable additional value.

12. A method according to claim 8, wherein the step of reducing the initial load adaptation signal to zero includes the step of:

subtracting one of a signal or a signal value increment of the speed controller output signal proportionally from a current engine load adaptation signal when said signals have different signs.

13. A method according to claim 12 further comprising the step of initializing the speed controller output signal after the current engine load adaptation signal has dropped to zero.

14. A method according to claim 12, further comprising the step of initializing the speed controller output signal after the current engine load adaptation signal has dropped to zero and after the cruise control output signal has reached a value of zero.

* * * * *